United States Patent [19]
Goss

[11] 4,257,074
[45] Mar. 17, 1981

[54] TIME OPTIMAL FUNCTION GENERATOR FOR DISK FILE MAGNETIC RECORDING HEAD SERVO POSITION CONTROL LOOP

[75] Inventor: Lloyd C. Goss, Bloomington, Minn.

[73] Assignee: Magnetic Peripherals Inc., Minneapolis, Minn.

[21] Appl. No.: 48,871

[22] Filed: Jun. 15, 1979

[51] Int. Cl.³ .................... G11B 21/08; G05B 13/00
[52] U.S. Cl. .................... 360/78; 318/561; 318/653; 360/77
[58] Field of Search .............. 360/78, 77, 97–99, 360/135; 318/561, 594, 632, 653

[56] References Cited

U.S. PATENT DOCUMENTS

| | | | |
|---|---|---|---|
| 3,209,338 | 9/1965 | Romuari | 360/78 |
| 3,399,391 | 8/1968 | Barrosse | 360/77 |
| 3,699,555 | 10/1972 | Du Vall | 360/78 |
| 4,030,132 | 6/1977 | Iftikar | 360/78 |
| 4,168,457 | 9/1979 | Rose | 360/78 |

*Primary Examiner*—Alfred H. Eddleman
*Attorney, Agent, or Firm*—William J. McGinnis

[57] ABSTRACT

A time optimal function generator in a coarse positioning system for magnetic heads in a magnetic disc device is designed to accelerate the magnetic heads as rapidly as possible to the exact point at which they must decelerate as rapidly as possible to stop at the new track location when moving from an old track location. This device uses as an input the output of a difference register which contains the difference between the present track address and the new track address. The system is designed to control the servo transducer positioning system in a generally linear fashion as it approaches the new track address but in a square root fashion when the difference is large. The system contains a square root response portion and a linear response portion with weighting devices to control the proportional response of the system.

2 Claims, 4 Drawing Figures

EQUATION (2) $\quad A i = \frac{K_2}{K_1} \left( e_o + \frac{1}{E} e_o^2 \right)$ $$(1) \quad e_i = \frac{R_2}{R_1} e_o + K \frac{R_3}{R_1} e_o^2$$

EQUATION (2)   $Ai = \dfrac{K_2}{K_1}\left(e_o + \dfrac{1}{E}e_o^2\right)$

TIME OPTIMAL FUNCTION GENERATOR FOR DISK FILE MAGNETIC RECORDING HEAD SERVO POSITION CONTROL LOOP

BACKGROUND OF THE INVENTION

This invention is related to the time optimal function generator in the coarse positioning system used in a magnetic disc device to position the magnetic heads over a new recording track from a present recording track. The invention more particularly relates to the servo drive circuit for causing the head positioning transducer to accelerate rapidly away from the old track location to the point at which deceleration must occur to arrive smoothly at the new track location.

It is known generally in physics that the fastest way for an object to travel from point A to point B is to accelerate as rapidly and as continuously as possible at the beginning of the journey until that exact point at which continuous rapid deceleration must occur to bring the object smoothly to a stop at the new location B. This principle is employed generally in magnetic disc systems to achieve the most rapid response time consistent with desirable operating conditions. Among these desirable operating conditions is that the magnetic heads arrive at the new track location smoothly without undershooting or overshooting the new location and having to hunt back and forth to arrive at the exact new location. Generally, most present systems contain servo control loops having what is called a time optimal function generator for deriving the position control signal for the position transducer mechanism to achieve the appropriate result. Thus the present invention falls within a category of such time optimal function generators for controlling magnetic disc systems in coarse address positioning operation.

The magnetic recording head servo position control loop for a disk file normally employs a time optimal function generator in the feedback loop to minimize the random average access time. The function generator modifies the position error signal in an approximate square root fashion which achieves a nearly constant deceleration rate for all length seeks. With the deceleration rate set approximately equal to the acceleration rate, time optimal operation is approached and the random average access time is minimized. In addition the recording heads must approach the desired data track with near critical damping to prevent undershoot or overshoot. This requires that the small signal gain of the function generator equals the value required for critical damping of the coarse servo control loop.

The characteristic required of a system for controlling the positioning transducer to produce good settling characteristics without overshoot or hunting is such that the servo system should be critically damped as the error approaches zero. By analysis it can be determined that for small position differences between present location and desired location this servo loop response should be linear. This is in contrast to the desired response of a time optimal function generator when the position difference is large. When large position differences exist this response should be a square root response to produce optimum controlled deceleration.

The coarse positioning loop is normally a second order servo loop. For small perturbations the loop gains are easily set for critical damping. As the perturbations increase in magnitude, a point is reached where proportional control is lost during deceleration. At this point the position error gain needs to be reduced to maintain proportional deceleration control. If the position error signal is reduced in a square root manner, the load will decelerate at a constant rate for a wide range of input perturbations. FIG. 1 shows a typical prior art second order servo control loop with the function generator in the position error portion of the loop.

Previous function generators consist of circuitry employing diode-transistor-resistor networks biased to conduct at selected voltages or break points to approximate a square root transfer function. This invention relates to an improved function generator circuit where the diode-transistor-resistor network is replaced with an inexpensive analog multiplier and the desired transfer function form of $A_i = K_1 e_o + K_2 e_o^2$ is achieved. Also the direct current drift problem normally associated with analog multipliers used in square root circuits is eliminated.

SUMMARY OF THE INVENTION

The invention described herein employs the output of a digital to analog converter operating on the digital contents of a difference register which contains the difference between the new track address and the present track address in order to derive a control signal for the servo positioning mechanism of a magnetic disc drive. The system employs a linear response amplifier having a feedback loop containing a conventional analogue voltage multiplier operating between the input voltage and the output voltage to produce a second order signal component used to override the linear portion of signal inputs.

The digital to analog converter becomes part of the function generator by being included in the feedback path. Thus, an analog multiplier is connected between the output voltage of the function generator and the reference voltage input of the digital to analog converter. As the output voltage level of the digital to analog converter increases, indicating a greater difference between the present position and the new position, the analog multiplier circuit causes the reference voltage to be reduced and thus reduces the incremental gain of the circuit.

IN THE FIGURES

DESCRIPTION OF THE PREFERRED EMBODIMENT

Figure 1:
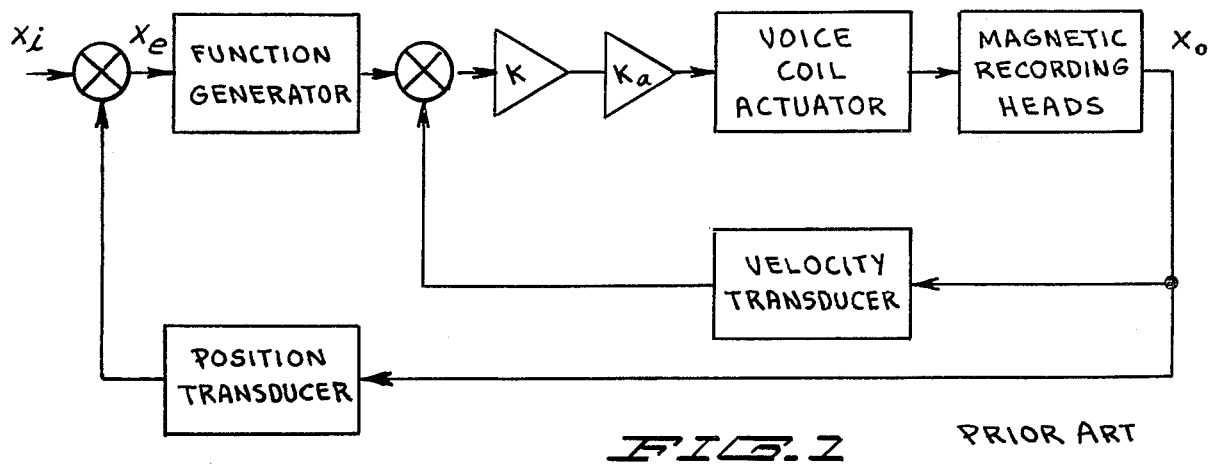
FIG. 1 is a diagram of a second order coarse positioning loop known to the prior art and forming the environment in which a function generator according to the present invention may function.
Figure 2:
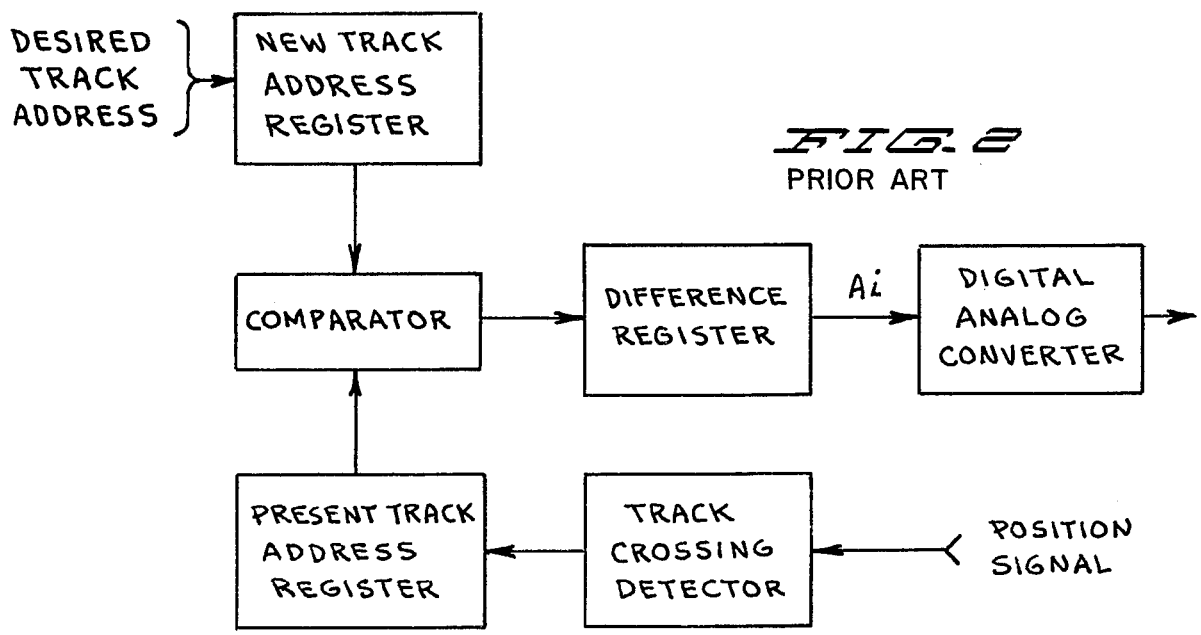
FIG. 2 is block diagram showing the method in which the input analog voltage signal is derived.

FIG. 2 shows the usual implementation of the position summing mode in a disk file servo. The difference register produces a digital output equal to the error between the present track and the desired track. The digital to analog converter produces a current proportional to the positioning error.

Figure 3:
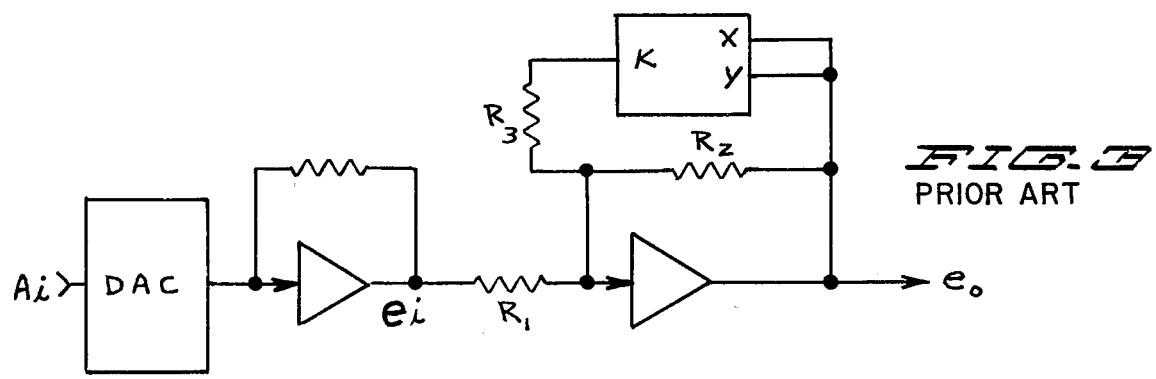
FIG. 3 shows an analog circuit employing a multiplier which has a linear output for small signals and a square root relationship for large signals.

FIG. 3 shows a circuit employing an analog multiplier which converts the digital to analog converter output into an error voltage which is linear for small signals and square root for large signals. Equation (1) shows that the small signal and large signal gains are controlled by the coefficients of $e_o$ and $e_o^2$ respectively. This allows independent control of the damping ratio near null by changing the ratio of R2/R1, and also independent control of the deceleration rate by changing the ratio of R3/R1. Unfortunately, analog multipliers have poor null drift characteristics which in this circuit causes the null of the function generator to drift excessively.

Figure 4:
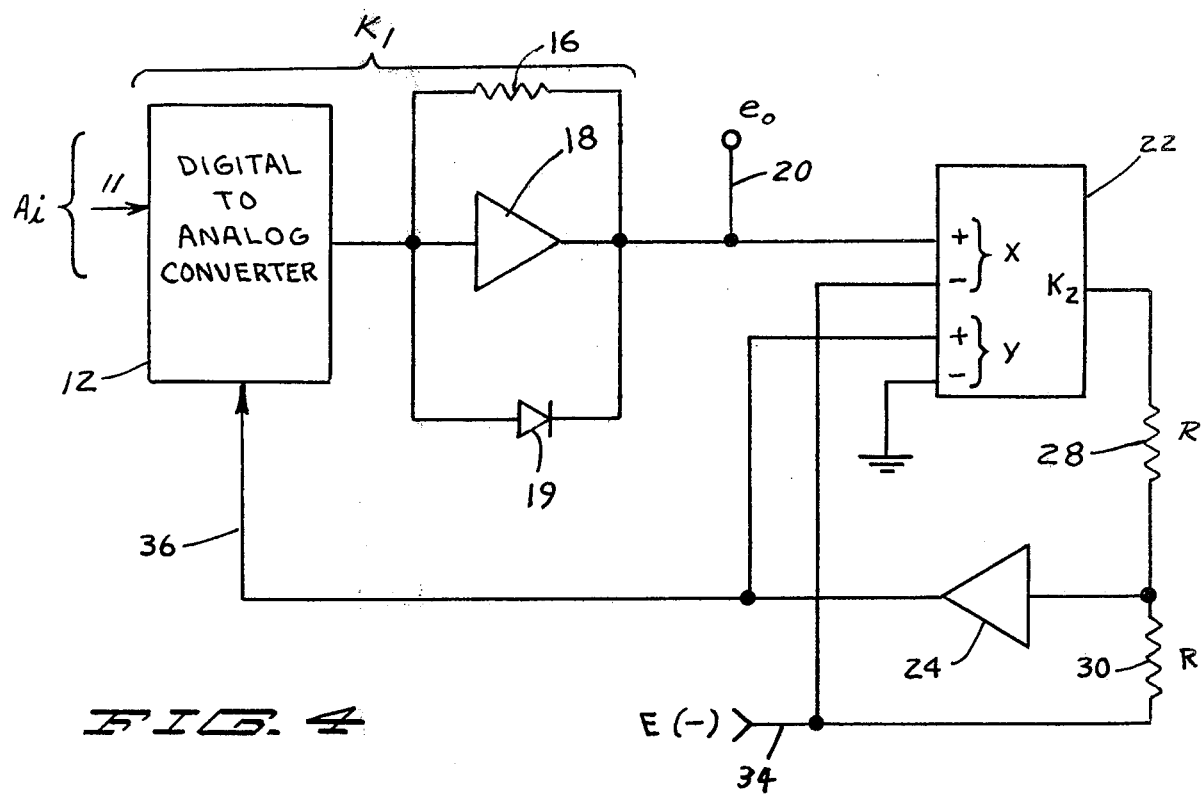
FIG. 4 is a circuit according to the present invention.

Referring now to FIG. 4 of the drawings, a system according to the present invention is shown having a digital input on input line 11 and having an output voltage on output line 20. The digital input is derived as the output of a difference register as shown in FIG. 2. Thus, the system is required to seek a new address shown in a new track address register. The system continuously monitors the present track location and stores this information in a present track address register both when the system is maintaining a location on a track for reading or writing and when the system is moving from a initial track location to a new track location. A comparator produces the digital difference between the two track addresses in the new track register and the present track address register. A difference register continuously contains this difference result and supplies it to the digital-to-analog converter.

Referring again to FIG. 4, a digital to analog converter (DAC) 12 receives a digital input on input line 11 and a second reference voltage on line 36 from the output of amplifier 24 system. The output of DAC 12 is connected to amplifier 18. Amplifier 18 has a feedback resistor 16 connected between the input and the output thereof. As previously noted, the output of amplifier 18 is the output line 20 of the circuit according to the present invention. As is known from general circuit theory, the product of the DAC Current Gain X R(16) represents the gain achieved by amplifier 18.

Signal gain of a circuit according to the present invention is controlled by a feedback loop containing analog multiplier 22. One input to analog multiplier 22 is the output signal voltage on output line 20 from amplifier 18. This output voltage on line 20 is connected to the positive X input of the multiplier. The negative X input will be discussed below. The multiplier 22 is of a conventional type which produces as an output the analog multiplication with a proportioning factor of the two input voltages. The second input of multiplier 22 is at the positive Y going input terminal thereof while the negative Y going input terminal is used as the ground reference. The output of multiplier 22 is connected through resistor 28 to a junction which forms the input to an amplifier 24. Resistor 30 is also connected to this same junction of resistor 28 and the input to amplifier 24. The other end of resistor 30 is connected to an input reference voltage E on input line 34. Input line 34 controls the proportionate share of the square root signal derived by this circuit which plays a part in determining large signal response. That is, altering the reference voltage E alters the large signal response of the circuit. Thus, a circuit according to the present invention may use a simple potentiometer type control in a voltage divider with a regulated voltage to determine and control large signal response. No resistor values or other plurality of circuit components is needed to adjust large signal response.

Amplifier 24 has its output connected to the positive going terminal of the second input to multiplier 22 and also forms a connection through line 36 to multiplier 12.

The circuit of FIG. 4 and equation (2) are shown with resistors 28 and 30 of equal value. With these resistors equal, equation (2) is simplified and readily illustrates the principle of operation. Unequal values of resistors 28 and 30 can be employed to fit a particular application although equation (2) becomes more complex.

The digital to analog converter becomes part of the function generator circuit if its output is used to modify its own reference voltage. FIG. 4 shows an analog multiplier connected in a circuit between the output voltage and reference voltage of the digital to analog converter. As the digital to analog converter output increases, the analog multiplier circuit reduces the reference voltage and thus the incremental gain.

Equation 2 in FIG. 4 describes the transfer function of this function generator. The equation shows that the desired form of input (Ai) being equal to a linear term plus a square form of the output (eo). This function generator provides independent adjustment of the deceleration rate only. Adjusting the initial slope will also change the deceleration rate.

In normal set up, the initial slope is set up first for small perturbations, and the deceleration rate is set in a second step for long moves. With the analog multiplier connected in the reference voltage circuit its null drift does not affect the null of the digital to analog converter. The inputs of the analog multiplier vary between one and ten volts, and the analog multiplier drift of milivolts causes only a slight variation in the decelaration rate and the initial slope.

The small signal gain can be varied directly with resistor 16 and the large signal gain can be varied directly by varying the magnitude of reference voltage E. This circuit provides a smooth square root function without break points and provides easy adjustment of the large signal gain. The problems of D.C. drift in the analog multipliers is insignificant since the drift referred to the input is in the range of millivolts and the input voltages $e_o$ and $e_r$ range from 1 volt to 10 volts. Small changes in these two voltages only change the overall gain slightly.

In summary, this function generator gives the desired transfer function by use of an inexpensive analog multiplier. The transfer function is devoid of approximations, sharp break points, and variations due to semiconductor drift. It also provides improved adjustment capabilities for setting initial slope and deceleration rate.

What is claimed is:

1. In a control circuit for controlling a transducer in movement from one position to another, the improvement comprising a function generator for controling said movement wherein said function generator is adapted to receive an input signal representative of the instantaneous position of the transducer and the desired new position and has an output signal which is adapted to control movement of said transducer, wherein said function generator is comprised of:

input signal means having first and second inputs for producing an output signal representative of electronic analog combination of signals received at said first and second inputs, wherein said first input signal is a signal representative of the difference between the instantaneous position of the transducer and the desired new position and wherein said second input signal is an internal reference voltage signal, summation amplifier means for receiving the output signal of said input signal means, said amplifier means producing an output signal which is the function generator output signal, an electronic analog multiplier having first and second input pairs, the positive terminal of said first pair being connected to the output of said function generator, a first and second resistor in series, said first resistor being connected to the output of said multiplier and said second resistor being connected to the negative terminal of said first input pair of said multiplier, operational amplifier means for receiving an input from the connection between said first and second resistor and providing an output to the positive terminal of said second input pair of said multiplier and to said second input of said input signal means as the internal reference voltage, and an external reference voltage source connected to said second resistor, the adjustment of said external voltage source causing an adjustment in the output signal amplitude of said function generator and wherein the output of said function generator contains a square root function of the input.

2. In a circuit for controlling the movement of a magnetic head transducer in a magnetic disk device, the improvement comprising a function generator for controling said movement wherein said function generator is adapted to receive a binary input signal representative of the binary difference between a new position binary address and a present position binary address and has an output signal which is adapted to control movement of said transducer wherein said function generator is comprised of:

input signal means having first and second inputs for producing an analog output signal representative of a first and second input signal supplied to said first and second inputs respectively, wherein said first input is a binary signal and said second input is an internal reference voltage, summation amplifier means for receiving the output of said input signal means and having as its output the output of said function generator, an electronic analog multiplier having first and second input pairs, the positive terminal of said first pair being connected to the output of said function generator, a first and second resistor in series, said first resistor being connected to the output of said multiplier and said second resistor being connected to the negative terminal of said first input pair, operational amplifier means for receiving an input from the connection between said first and second resistor and providing an output to the positive terminal of said second input pair of said multiplier and to said second input of said input signal means as the internal reference voltage, and an external reference voltage source connected to said second resistor, the adjustment of said external voltage source causing an adjustment in the output signal amplitude of said function generator and wherein the output of said function generator contains a square root function of the input.

* * * * *